F. S. DICKINSON.
METHOD OF CONSTRUCTING PNEUMATIC TIRES.
APPLICATION FILED FEB. 26, 1915.
1,182,357.
Patented May 9, 1916.
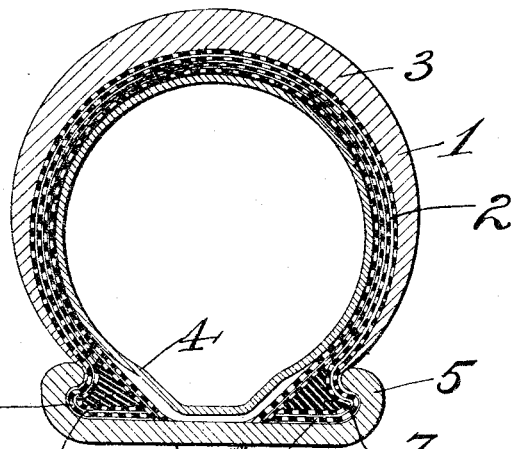
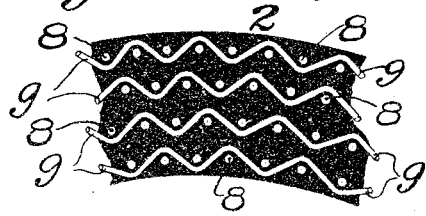
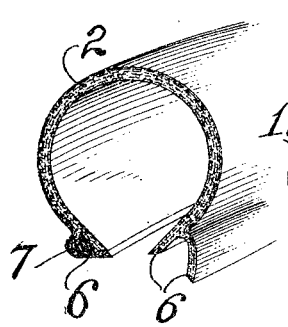
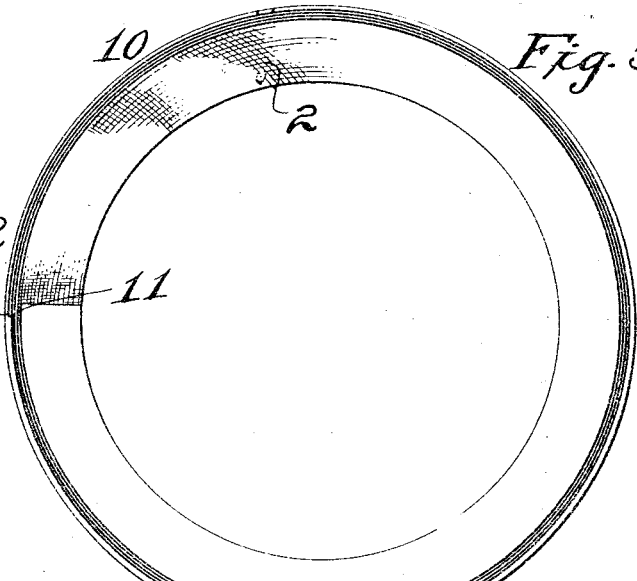
Witnesses:
Inventor:
Fredrick S. Dickinson
By his Attorney

UNITED STATES PATENT OFFICE.

FREDRICK S. DICKINSON, OF NEW YORK, N. Y.

METHOD OF CONSTRUCTING PNEUMATIC TIRES.

1,182,357.  Specification of Letters Patent.  Patented May 9, 1916.

Application filed February 26, 1915. Serial No. 10,668.

*To all whom it may concern:*

Be it known that I, FREDRICK S. DICKINSON, a citizen of the United States, and resident of New York, in the county and State of New York, have invented certain new and useful Improvements in Methods of Constructing Pneumatic Tires, of which the following is a specification.

This invention relates to methods of constructing pneumatic tires such as are now commonly used upon automobiles and other vehicles and which comprise an elastic shoe or casing which constitutes the outer portion and tread of the tire and incloses the inner air tube and which has an internal textile body fabric or carcass.

My present improvements have particular relation to the method of constructing the internal textile body fabric or carcass for the shoe or casing of pneumatic tires, of the improved woven type shown and described in my previous Patent No. 1,115,409, granted October 27, 1914.

Under the method of constructing the internal textile woven body fabric, as comprised in my previous patent above mentioned, the body fabric is initially woven in the contour of an endless annular and segmental cross-section ring conforming to the contour of the elastic body of the shoe or casing within which it is to be embedded, and with its threads or strands initially in normal relationship to said body contour, and constitutes a homogeneous endless textile body which is united with the elastic body of the shoe or casing without distortion of its initial woven body contour and without distortion of its threads or strands. The fabric, as constructed according to the method comprised in my previous patent, as just set forth, is in endless annular or ring form, and when said fabric is produced with a plurality of layers or plies the endless annular respective layers or plies are superposed one above the other and are interwoven or directly connected together.

The object of my present improved method of constructing the casings of pneumatic tires is to produce an improved internal textile body fabric having all the characteristics and advantages of the type of woven fabric produced by my previous method as above set forth, but which will obviate the employment of the respective superposed endless layers or plies and will effectively produce a unitary multiple-ply body fabric having all the characteristics and advantages of my previous invention without the weaving thereof in endless form.

A further object of my present improved method is to produce a simple and improved woven body fabric of the class above set forth which can be more readily and economically manufactured as a multiple-ply fabric, and to produce a simple and improved tire shoe or casing which will possess maximum advantages in point of durability, effectiveness, strength, and general efficiency.

To these ends, my present improved method consists in weaving or constructing the body fabric initially in a continuous woven strip and in a segmental cross-section and annular contour conforming to the contour of the elastic body of the shoe or casing within which it is embedded, and in continuously carrying or winding the strip upon itself in line with the annular circumference of the tire to produce multiple layers or plies, and the method further comprises the impregnation of the homogeneous textile unit constituted by said body fabric with caoutchouc or rubber without distortion of its initial woven body contour, and in uniting said textile body unit with the elastic body of the shoe or casing structure without distortion of its initial woven body contour, substantially as hereinafter described and particularly pointed out in the claims.

In the drawings—Figure 1 is a cross-section of a pneumatic tie of a type to which my improved method of constructing the shoe or casing relates. Fig. 2 is a detail section, on an enlarged or magnified scale, on a plane transverse of the body fabric as constructed according to my improved method. Fig. 3 is a detail section corresponding to Fig. 2, on a plane longitudinal of the body fabric. Fig. 4 is an outline view, showing a transverse cross-section of the body fabric and a part of the longitudinal extent thereof in perspective, as said fabric is finished according to my improved method and ready for assembling in the tire construction. Fig. 5 is an outline view illustrating a longitudinal section of the body fabric as would in its continuous length to produce the multiple-ply fabric in the annular contour conforming to the contour of the elastic body of the shoe or casing, according to my improved method, and ready for assembling in tire construction.

Corresponding parts in all the figures, are denoted by the same reference characters.

Referring to the drawings, 1 designates the tire shoe or casing, which comprises the fabric body, 2, and elastic external portion constituting the tread, 3, which casing incloses the inner air tube, 4, and is held in connection with the wheel rim, 5. I have herein illustrated a "clencher" tire, which is one of the types to which my improvements are adapted, and in this type the casing has the terminal edge or base portions, 6, of its segmental cross-sectional contour clenched within the edge flanges of the rim 5, said edge portions 6 being for this purpose enlarged and provided with a continuous strip of hard rubber, as at 7, inclosed within a pocket formed at the edge construction of the body fabric.

In the method of constructing the body fabric 2, as comprised in my present improvements, the fabric is woven as a unitary textile body fabric conforming to the annular and segmental cross-section shape or contour of the shoe or casing and having a plurality of layers or plies. The homogeneous unitary body fabric, as produced by my present improved method of construction, is woven in a continuous strip, in any suitable weave, preferably in the usual weave composed of interwoven warp and woof threads or strands, 8 and 9, on the bias with relation to the cross-sectional plane of the tire or in straight lines transversely and longitudinally of the tire casing, as preferred. Said continuous strip is woven initially in the annular and segmental cross-section contour conforming to the contour of the elastic body of the shoe or casing within which it is to be embedded, and is carried or wound upon itself in line with the annular circumference of the tire, preferably in a continuous weaving in its annular and segmental cross-section contour, to produce multiple layers or plies, as at 10. In the continuous weaving of the multiple-ply wound strip, its threads or strands are initially woven in normal relationship to the annular and segmental cross-section body contour conforming to the contour of the elastic body of the shoe or casing within which it is to be embedded, and the fabric body constitutes a homogeneous textile unit in normal condition for placement in association with the elastic body of the shoe or casing and is united therewith without distortion of its initial woven body contour and without distortion of its threads or strands.

The characteristics above described, as produced by my present improved method of construction, afford uniform conditions and a uniform torsional status throughout the entire unitary multiple-ply fabric, and possess all the advantages of the endless type of such woven fabric as produced by the method set forth in my previous patent above referred to, and they also obviate all the disadvantages and loss of effective service which result from the separate-layer and pieced construction of internal tire body fabrics produced under the methods employed prior to my improvements comprising the method of initially weaving the same in the normal contour as set forth herein and in my previous patent above noted.

In carrying out my present improved method of constructing the body fabric, the terminal ends, 11 and 12, of the unitary wound multiple-ply strip which is produced and constitutes the body fabric, may be secured in any suitable manner. For instance, they may be connected with or fastened to the body fabric or they may be retained by the caoutchouc filler with which the fabric is impregnated. The improved woven body fabric thus produced by my improved method has no lap joints or seams, and has all the characteristics of the uniform conditions throughout the entire unitary multiple-ply endless woven body fabric of the type produced by the method covered by my previous patent above referred to except the terminal edges at the ends 11 and 12 of the continuous wound strip which is produced according to my present improved method.

In further carrying out the present method, the unitary body fabric woven in the contour and construction as above set forth is impregnated as a whole or unit with caoutchouc or rubber without distortion of its initial woven body contour and without stretching or distortion of its threads or strands, and forms when thus completed with the caoutchouc filler a homogeneous textile unit in normal condition for placement in association with the elastic body of the shoe or casing without distortion of its initial woven body contour and without distortion of its threads or strands. The impregnation of the improved body fabric, to combine the textile and caoutchouc filler, or the application of caoutchouc or rubber thereto, may be effected in any suitable or adapted manner, but I preferably impregnate the fabric under any of the well-known vacuum processes.

The body fabric or carcass unit, constituted by the homogeneous textile and caoutchouc body, as above described, is united or placed in association with the elastic body of the shoe or casing structure without distortion of its initial woven body contour and without stretching or distortion of its threads or strands, and the whole is vulcanized in the usual manner.

Under some conditions of employment of the improved method constituting my present invention, in case a single-ply body fabric is to be produced, the fabric may be woven in strip form initially in the annular and segmental cross-section contour conforming to the contour of the elastic body of the shoe or casing within which it is to be embedded, and the terminal ends of the strip are initially connected or secured together after its initial weaving in said normal contour.

I do not desire to be understood as limiting myself to the detail features of the method of construction as herein illustrated and described, as it is manifest that variations thereon may be resorted to in the adaptation of the method of construction to varying conditions according to the type of pneumatic tire casing to which the woven body fabric as produced by my method is to be applied, without departing from the spirit and scope of my invention and improvements. I therefore reserve the right to all such variations and modifications as properly fall within the scope of my invention and the terms of the following claims.

Having thus described my invention, I claim and desire to secure by Letters Patent:

1. The method of constructing a shoe or casing for pneumatic tires, which consists in weaving the internal textile body fabric or carcass initially in a continuous strip and in a segmental cross-section and annular contour conforming to the contour of the elastic body of the shoe or casing within which it is to be embedded, and with its threads or strands initially in normal relationship to said body contour, and continuously carrying or winding said strip upon itself in line with the annular circumference of the shoe or casing, without distortion of its initial woven body contour and without stretching or distortion of its threads or strands, to produce a homogeneous textile unit having multiple plies and in normal condition for placement in association with the elastic body of the shoe or casing, and then uniting said textile body unit with the elastic body of the shoe or casing structure without distortion of its initial woven and wound body contour and without stretching or distortion of its threads or strands.

2. The method of constructing a shoe or casing for pneumatic tires, which consists in weaving the internal textile body fabric or carcass in a continuous strip and in a segmental cross-section and annular contour conforming to the contour of the elastic body of the shoe or casing within which it is to be embedded, and continuously carrying or winding said strip upon itself in line with the annular circumference of the shoe or casing, without distortion of its initial woven body contour, and without stretching or distortion of its threads or strands, to produce a homogeneous textile unit in normal condition for placement in association with the elastic body of the shoe or casing, and then uniting said textile body unit with the elastic body of the shoe or casing structure without distortion of its woven and wound body contour and without stretching or distortion of its threads or strands.

3. The method of constructing a shoe or casing for pneumatic tires, which consists in weaving the internal textile body fabric or carcass initially in a continuous strip and in a segmental cross-section and annular contour conforming to the contour of the elastic body of the shoe or casing within which it is to be embedded, with its threads or strands initially in normal relationship to said body contour, and with said strip extending continuously in its annular contour in line with the annular circumference of the shoe or casing without distortion of its initial woven body contour and without stretching or distortion of its threads or strands to produce a homogeneous textile unit in normal condition for placement in association with the elastic body of the shoe or casing, and then uniting said textile body unit with the elastic body of the shoe or casing structure without distortion of its initial woven body contour and without stretching or distortion of its threads or strands.

4. The method of constructing a shoe or casing for pneumatic tires, which consists in weaving the internal textile body fabric or carcass in a continuous strip and in a segmental cross-section and annular contour conforming to the contour of the elastic body of the shoe or casing within which it is to be embedded, with its threads or strands in normal relationship to said body contour, and with said strip extending continuously in its annular contour in line with the annular circumference of the shoe or casing without distortion of its woven body contour and without stretching or distortion of its threads or strands to produce a homogeneous textile unit in normal condition in association with the elastic body of the shoe or casing, and then uniting said textile body unit with the elastic body of the shoe or casing structure without distortion of its woven body contour and without stretching or distortion of its threads or strands.

5. The method of constructing a shoe or casing for pneumatic tires, which consists in weaving the internal textile body fabric or carcass initially in a continuous strip and in a segmental cross-section and annular contour conforming to the contour of the elastic body of the shoe or casing within which it is to be embedded, and with its threads or strands initially in normal relationship to said body contour, and continuously carrying or winding said strip upon itself in line with the annular circumference of the shoe or casing without distortion of its initial woven body contour and without stretching or distortion of its threads or strands to produce a homogeneous textile unit having multiple plies and in normal condition for placement in association with the elastic body of the shoe or casing, then applying to said textile body unit while in its initial woven and wound contour and with its threads or strands in normal relationship thereto a caoutchouc filler, and then uniting said textile body unit with the elastic body of the shoe or casing structure without distortion of its initial woven and wound body contour and without stretching or distortion of its threads or strands.

6. The method of constructing a shoe or casing for pneumatic tires, which consists in weaving the internal textile body fabric or carcass initially in a continuous strip and in a segmental cross-section and annular contour conforming to the contour of the elastic body of the shoe or casing within which it is to be embedded, with its threads or strands initially in normal relationship to said body contour, and with said strip extending continuously in its annular contour in line with the annular circumference of the shoe or casing without distortion of its initial woven body contour and without stretching or distortion of its threads or strands, to produce a homogeneous textile unit in normal condition for placement in association with the elastic body of the shoe or casing, then applying to said textile body unit while in its initial woven contour and with its threads or strands in normal relationship thereto a caoutchouc filler, and then uniting said textile body unit with the elastic body of the shoe or casing structure without distortion of its initial woven body contour and without stretching or distortion of its threads or strands.

In witness whereof I have signed my name in the presence of the subscribing witnesses.

FREDRICK S. DICKINSON.

Witnesses:
 Jos. REED LITTELL,
 AGNES LEE.